(12) United States Patent
Lee et al.

(10) Patent No.: US 10,506,535 B2
(45) Date of Patent: Dec. 10, 2019

(54) METHOD FOR TERMINAL TRANSMITTING SIDELINK IN WIRELESS COMMUNICATION SYSTEM, AND TERMINAL USING SAME

(71) Applicant: LG Electronics Inc., Seoul (KR)

(72) Inventors: Seungmin Lee, Seoul (KR); Hanbyul Seo, Seoul (KR); Hyukjin Chae, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/335,829

(22) PCT Filed: Jan. 15, 2018

(86) PCT No.: PCT/KR2018/000692
§ 371 (c)(1),
(2) Date: Mar. 22, 2019

(87) PCT Pub. No.: WO2018/131972
PCT Pub. Date: Jul. 19, 2018

(65) Prior Publication Data
US 2019/0253990 A1      Aug. 15, 2019

Related U.S. Application Data

(60) Provisional application No. 62/577,789, filed on Oct. 27, 2017, provisional application No. 62/445,749, filed on Jan. 13, 2017.

(51) Int. Cl.
*H04W 4/00* (2018.01)
*H04W 56/00* (2009.01)
(Continued)

(52) U.S. Cl.
CPC ......... *H04W 56/001* (2013.01); *H04L 1/1614* (2013.01); *H04L 5/1469* (2013.01);
(Continued)

(58) Field of Classification Search
None
See application file for complete search history.

(56) References Cited

U.S. PATENT DOCUMENTS

2016/0128009 A1* 5/2016 Yoon ................. H04W 4/70
                                                                 370/350
2016/0234045 A1* 8/2016 Lindoff ........... H04L 25/03866
(Continued)

FOREIGN PATENT DOCUMENTS

WO     WO2016048075       3/2016

OTHER PUBLICATIONS

Zte, "Allocation of reserved subframe for V2X resources pool", R1-1612107, 3GPP TSG RAN WG1 Meeting #87, Reno, USA, dated Nov. 14-18, 2016, 5 pages.
(Continued)

*Primary Examiner* — Zewdu A Beyen
(74) *Attorney, Agent, or Firm* — Fish & Richardson P.C.

(57) ABSTRACT

Provided are a method for a terminal transmitting a sidelink in a wireless communication system, and a terminal using same. The method comprises: determining at least one sidelink subframe for sidelink transmission from subframes, in a set of all subframes, other than subframes having a sidelink synchronization signal (SLSS) resource configured, and reserved subframes; and transmitting the sidelink using the at least one sidelink subframe.

10 Claims, 10 Drawing Sheets

(51) Int. Cl.
    *H04W 72/04*    (2009.01)
    *H04W 80/08*    (2009.01)
    *H04W 92/18*    (2009.01)
    *H04L 5/14*     (2006.01)
    *H04W 4/40*     (2018.01)
    *H04W 4/70*     (2018.01)
    *H04L 1/16*     (2006.01)

(52) U.S. Cl.
    CPC .............. *H04W 4/40* (2018.02); *H04W 4/70* (2018.02); *H04W 72/0446* (2013.01); *H04W 80/08* (2013.01); *H04W 92/18* (2013.01)

(56) References Cited

U.S. PATENT DOCUMENTS

| | | | |
|---|---|---|---|
| 2016/0302249 A1 | 10/2016 | Sheng | |
| 2017/0013577 A1* | 1/2017 | Berggren | H04B 7/2656 |
| 2017/0280406 A1* | 9/2017 | Sheng | H04W 4/70 |
| 2017/0289934 A1* | 10/2017 | Sheng | H04W 56/001 |
| 2018/0098323 A1* | 4/2018 | Zhang | H04L 5/00 |
| 2018/0249462 A1* | 8/2018 | Blasco Serrano | H04B 7/26 |

OTHER PUBLICATIONS

Intel Corporation, "Support of sidelink V2V communication in LTE TDD systems", R1-1611920, 3GPP TSG RAN WG1 Meeting #87, Reno, USA, dated Nov. 14-18, 2016, 5 pages.

Huawei, HiSilicon, "Discussion of V2V support for TDD", R1-1611129, 3GPP TSG RAN WG1 Meeting #87, Reno, USA, dated Nov. 14-18, 2016, 4 pages.

* cited by examiner

METHOD FOR TERMINAL TRANSMITTING SIDELINK IN WIRELESS COMMUNICATION SYSTEM, AND TERMINAL USING SAME

CROSS-REFERENCE TO RELATED APPLICATIONS

This application is a National Stage application under 35 U.S.C. § 371 of International Application No. PCT/KR2018/000692, filed on Jan. 15, 2018, which claims the benefit of U.S. Provisional Application No. 62/577,789, filed on Oct. 27, 2017, and U.S. Provisional Application No. 62/445,749, filed on Jan. 13, 2017. The disclosures of the prior applications are incorporated by reference in their entirety.

BACKGROUND OF THE INVENTION

Field of the invention

The present invention relate to wireless communication, and more particularly, to a method in which a terminal performs sidelink transmission in a wireless communication system, and the terminal using the method.

Related Art

In International Telecommunication Union Radio communication sector (ITU-R), a standardization task for International Mobile Telecommunication (IMT)-Advanced, that is, the next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, 3$^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

There is a growing interest in a Device-to-Device (D2D) technology in which devices perform direct communication. In particular, D2D has been in the spotlight as a communication technology for a public safety network. A commercial communication network is rapidly changing to LTE, but the current public safety network is basically based on the 2G technology in terms of a collision problem with existing communication standards and a cost. Such a technology gap and a need for improved services are leading to efforts to improve the public safety network.

The public safety network has higher service requirements (reliability and security) than the commercial communication network. In particular, if coverage of cellular communication is not affected or available, the public safety network also requires direct communication between devices, that is, D2D operation.

D2D operation may have various advantages in that it is communication between devices in proximity. For example, D2D UE has a high transfer rate and a low delay and may perform data communication. Furthermore, in D2D operation, traffic concentrated on a base station can be distributed. If D2D UE plays the role of a relay, it may also play the role of extending coverage of a base station.

Meanwhile, in LTE-A, a UE-to-UE interface is referred to as a sidelink. The sidelink may also be used in communication between UEs installed in vehicles or between a UE installed in a vehicle and another UE, that is, vehicle-to-everything (V2X).

However, when determining a resource used in V2X communication, there is a need to consider a subframe not suitable for performing V2X communication or a subframe for transmitting a V2X channel which has a relatively high priority and which must be protected from interference from another V2X signal.

In addition, when a resource that can be used in V2X communication is informed to a UE in a bitmap form, a reserved subframe may be configured to avoid ambiguity in indexing between the bitmap and subframes and to improve convenience. In this case, there is a need to specify how to configure the reserved subframe.

SUMMARY OF THE INVENTION

The present invention provides a method of performing sidelink transmission of a terminal in a wireless communication system, and the terminal using the method.

In one aspect, provided is a method of performing sidelink transmission of a terminal in a wireless communication system. The method includes determining at least one subframe for sidelink transmission in the remaining subframes excluding a subframe in which a sidelink synchronization signal (SLSS) resource is configured and a reserved subframe in a set of all subframes and performing sidelink transmission by using the at least one sidelink subframe.

The set of all subframes may include 10240 subframes.

If the wireless communication system is a time division duplex (TDD) system, the reserved subframe may be determined by arranging the remaining subframes, excluding the subframe in which the SLSS resource is configured, a downlink subframe, and a special subframe, in an increasing (ascending) order of a subframe index, in the set of all subframes, and on the basis of the number $N_{reserved}$ of reserved subframes among the remaining subframes.

The number $N_{reserved}$ of the reserved subframes may be determined based on a length $L_{bitmap}$ of a bitmap indicating the at least one sidelink subframe and the number of the remaining subframes.

When $l_0, l_1, \ldots, l_{(10240-Nslss-Ndssf-1)}$ denote subframes, excluding the number $N_{slss}$ of subframes in which the SLSS resource is configured and the number $N_{dssf}$ of the downlink subframes and special subframes, arranged in an increasing order of a subframe index in the set of all subframes, the reserved subframe $l_r$ ($0 \le r < (10240-N_{slss}-N_{dssf})$) may be determined by the following equation:

$$r = \left\lfloor \frac{m \cdot (10240 - N_{slss} - N_{dssf})}{N_{reserved}} \right\rfloor,$$

where m=0, . . . , $N_{reserved}$−1, $N_{reserved}$=(10240−$N_{slss}$−$N_{dssf}$) mod $L_{bitmap}$.

The length $L_{bitmap}$ of the bitmap may be configured by a higher layer.

The wireless communication system may be a frequency division duplex (FDD) system.

If the wireless communication system is a time division duplex (TDD) system, at least one sidelink subframe for sidelink transmission may be determined in the remaining subframes excluding a subframe in which a sidelink synchronization signal (SLSS) resource is configured, a downlink subframe and a special subframe, and a reserved subframe in a set of all subframes.

In another aspect, provided is a user equipment (UE). The UE includes a transceiver for transmitting and receiving a radio signal and a processor operatively coupled to the transceiver. The processor is configured to determine at least one subframe for sidelink transmission in the remaining subframes excluding a subframe in which a sidelink synchronization signal (SLSS) resource is configured and a reserved subframe in a set of all subframes and perform sidelink transmission by using the at least one sidelink subframe.

According to the present invention, a reserved subframe required to determine a subframe used in V2X communication may be evenly configured between subframes in a DFN range. When the reserved subframe is configured temporally consecutively, V2X communication becomes impossible in a corresponding time domain, and thus it may be difficult to perform V2X communication periodically. On the other hand, such a problem can be solved by using the present invention.

DESCRIPTION OF EXEMPLARY
EMBODIMENTS

Figure 1:
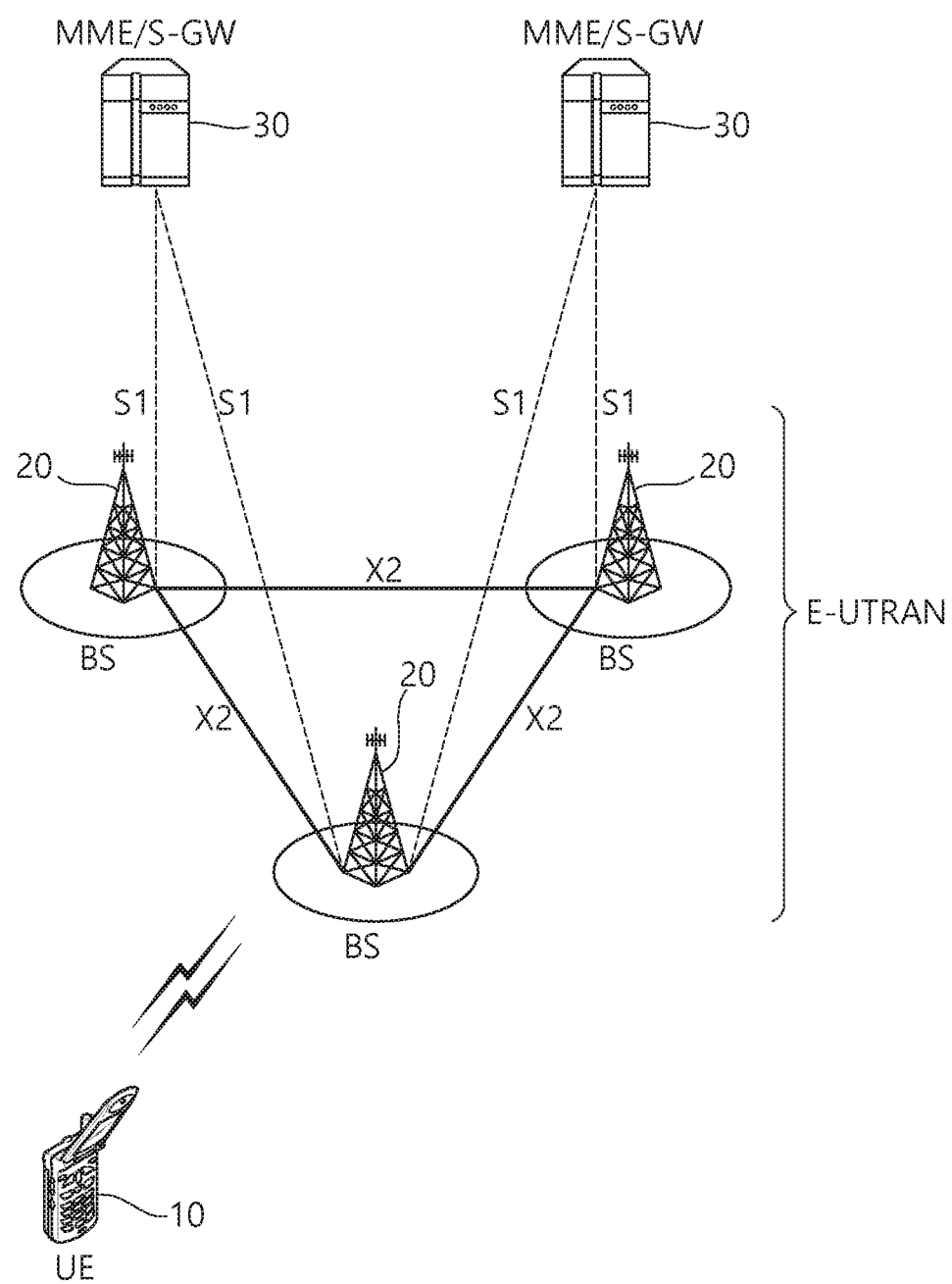
FIG. 1 shows a wireless communication system.

FIG. 1 shows a wireless communication system.

The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS A wireless communication system may be a time division duplex (TDD) system, a frequency division duplex (FDD) system, or a system in which TDD and FDD are used together. The following table shows an example in which a downlink subframe and a special subframe are arranged according to an uplink-downlink configuration in one frame in TDD.

TABLE 1

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Figure 2:
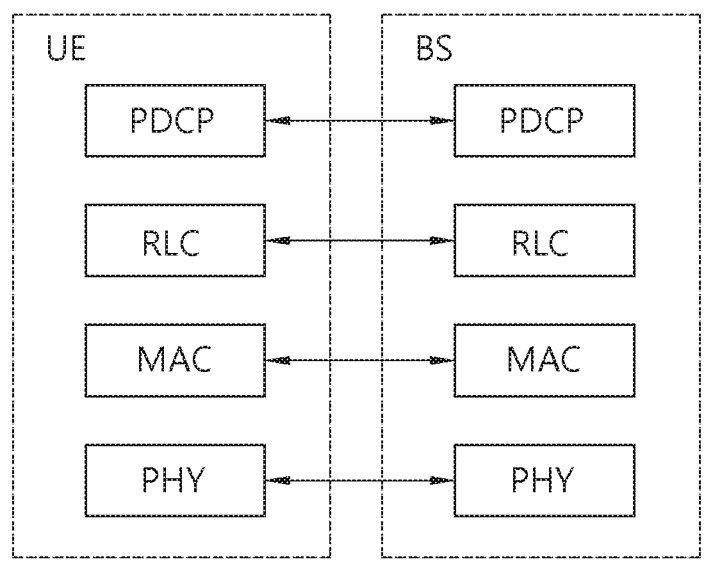
FIG. 2 is a diagram showing a wireless protocol architecture for a user plane.
Figure 3:
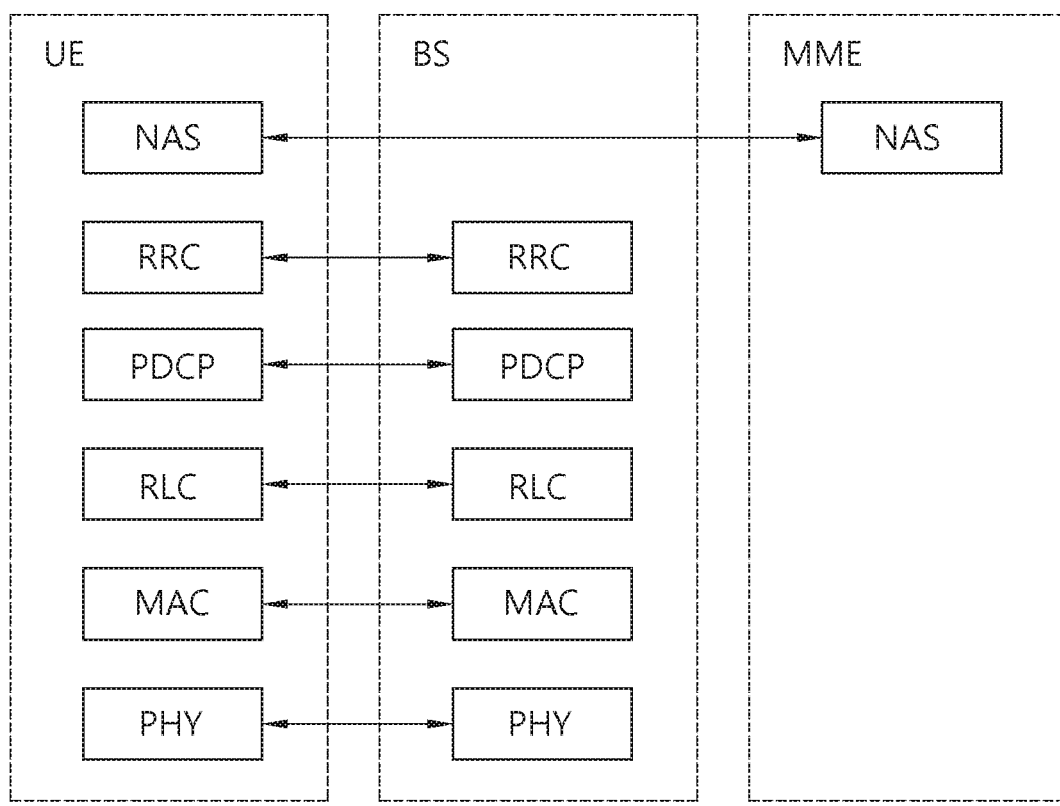
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

The D2D operation will now be described. In 3GPP LTE-A, the service related to D2D operation is called proximity based service (ProSe). Hereinafter, ProSe is equivalent to D2D operation and ProSe may be interchanged with D2D operation. ProSe will now be described.

The ProSe includes ProSe direction communication and ProSe direct discovery. The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity.

Hereinafter, for convenience, the ProSe direct communication may be referred to as D2D communication, and the ProSe direct discovery may be referred to as D2D discovery.

Figure 4:
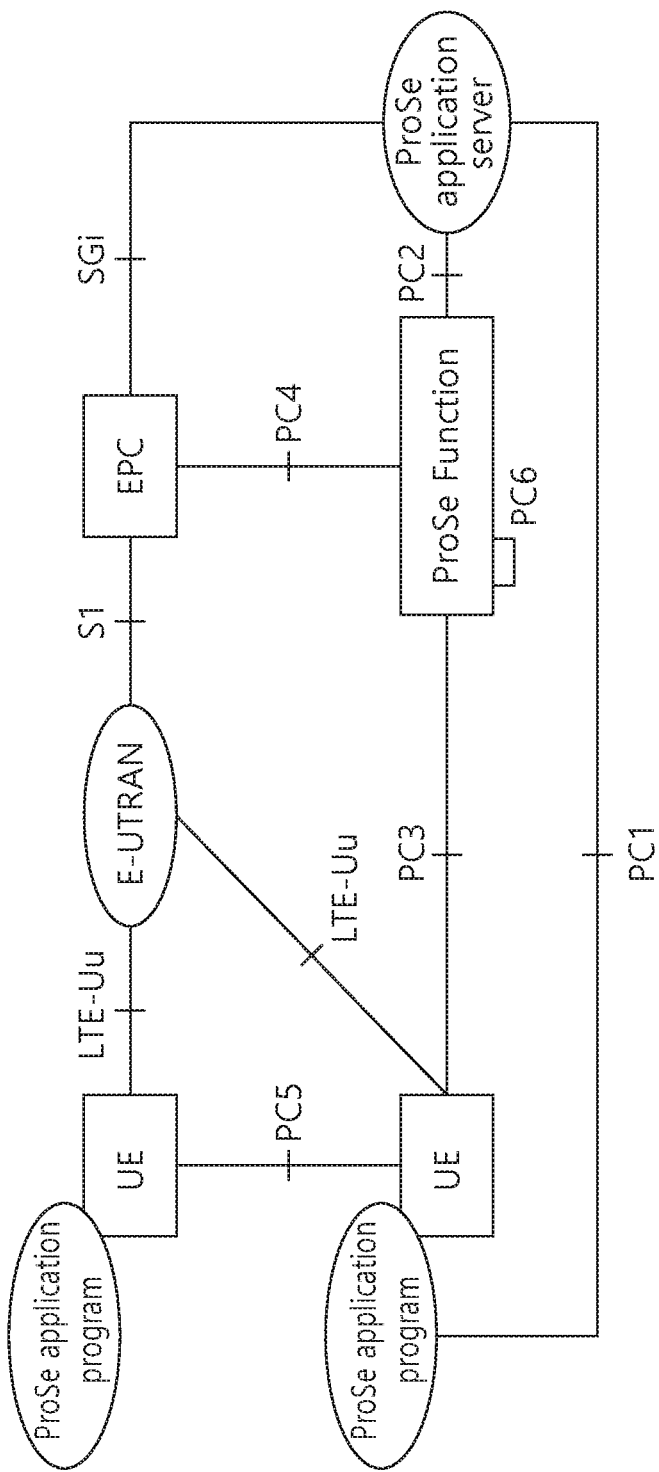
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function.

The EPC represents an E-UTRAN core network configuration. The EPC may include an MME, an S-GW, a P-GW, a policy and charging rules function (PCRF), a home subscriber server (HSS) and so on.

The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications
Authorization and configuration of UE for discovery and direct communication
Enable the functionality of EPC level ProSe discovery
ProSe related new subscriber data and handling of data storage, and also handling of the ProSe identities
Security related functionality
Provide control towards the EPC for policy related functionality
Provide functionality for charging (via or outside of the EPC, e.g., offline charging)

A reference point and a reference interface in the basic structure for ProSe are described below.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

The D2D operation may be supported both when UE is serviced within the coverage of a network (cell) or when it is out of coverage of the network.

Figure 5:
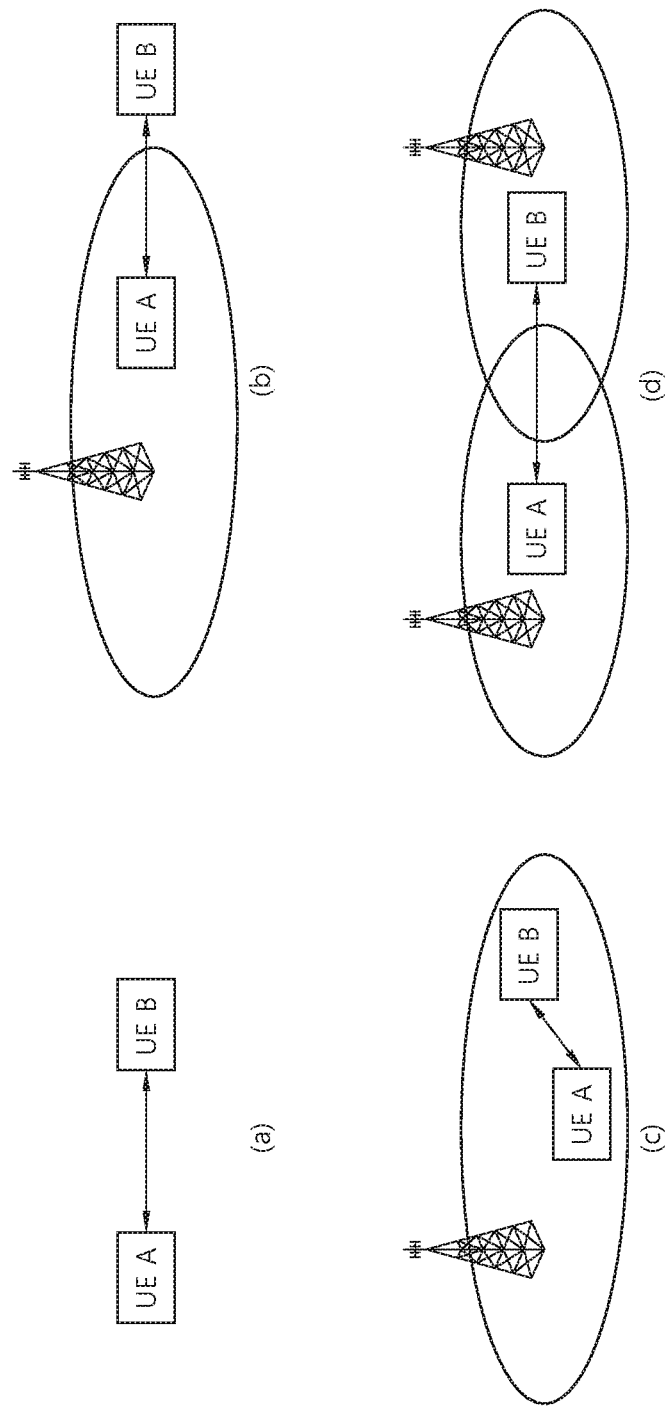
FIG. 5 shows the deployment examples of types of UE performing ProSe direct communication and cell coverage.

FIG. 5 shows the deployment examples of types of UE performing ProSe direct communication and cell coverage.

Referring to FIG. 5(a), types of UE A and B may be placed outside cell coverage. Referring to FIG. 5(b), UE A may be placed within cell coverage, and UE B may be placed outside cell coverage. Referring to FIG. 5(c), types of UE A and B may be placed within single cell coverage. Referring to FIG. 5(d), UE A may be placed within coverage of a first cell, and UE B may be placed within coverage of a second cell.

ProSe direct communication may be performed between types of UE placed at various positions as in FIG. 5.

<Radio Resource Allocation for D2D Communication (ProSe Direct Communication)>.

At least one of the following two modes may be used for resource allocation for D2D communication.

1. Mode 1

Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2. Mode 2

Mode 2 is mode in which UE directly selects a resource. UE directly selects a resource for ProSe direct communication in a resource pool. The resource pool may be configured by a network or may have been previously determined.

Meanwhile, if UE has a serving cell, that is, if the UE is in the RRC_CONNECTED state with an eNB or is placed in a specific cell in the RRC_IDLE state, the UE is considered to be placed within coverage of the eNB.

If UE is placed outside coverage, only mode 2 may be applied. If the UE is placed within the coverage, the UE may use mode 1 or mode 2 depending on the configuration of an eNB.

If another exception condition is not present, only when an eNB performs a configuration, UE may change mode from mode 1 to mode 2 or from mode 2 to mode 1.

<D2D Discovery (ProSe Direct Discovery)>

D2D discovery refers to the procedure used in a ProSe capable terminal discovering other ProSe capable terminals in close proximity thereto and may be referred to as ProSe direct discovery. The information used for ProSe direct discovery is hereinafter referred to as discovery information.

APC 5 interface may be used for D2D discovery. The PC 5 interface includes an MAC layer, a PHY layer, and a ProSe Protocol layer, that is, a higher layer. The higher layer (the ProSe Protocol) handles the permission of the announcement and monitoring of discovery information. The contents of the discovery information are transparent to an access stratum (AS). The ProSe Protocol transfers only valid discovery information to the AS for announcement. The MAC layer receives discovery information from the higher layer (the ProSe Protocol). An IP layer is not used to send discovery information. The MAC layer determines a resource used to announce discovery information received from the higher layer. The MAC layer produces an MAC protocol data unit (PDU) for carrying discovery information and sends the MAC PDU to the physical layer. An MAC header is not added.

In order to announce discovery information, there are two types of resource assignment.

1. Type 1

The type 1 is a method for assigning a resource for announcing discovery information in a UE-not-specific manner. An eNB provides a resource pool configuration for discovery information announcement to types of UE. The configuration may be broadcasted through the SIB. The configuration may be provided through a UE-specific RRC message. Or the configuration may be broadcasted through other than the RRC message in other layer or may be provided by UE-specific signaling.

UE autonomously selects a resource from an indicated resource pool and announces discovery information using the selected resource. The UE may announce the discovery information through a randomly selected resource during each discovery period.

2. Type 2

The type 2 is a method for assigning a resource for announcing discovery information in a UE-specific manner. UE in the RRC_CONNECTED state may request a resource for discovery signal announcement from an eNB through an RRC signal. The eNB may announce a resource for discovery signal announcement through an RRC signal. A resource for discovery signal monitoring may be assigned within a resource pool configured for types of UE.

An eNB 1) may announce a type 1 resource pool for discovery signal announcement to UE in the RRC_IDLE state through the SIB. Types of UE whose ProSe direct discovery has been permitted use the type 1 resource pool for discovery information announcement in the RRC_IDLE state. Alternatively, the eNB 2) announces that the eNB supports ProSe direct discovery through the SIB, but may not provide a resource for discovery information announcement. In this case, UE needs to enter the RRC_CONNECTED state for discovery information announcement.

An eNB may configure that UE has to use a type 1 resource pool for discovery information announcement or has to use a type 2 resource through an RRC signal in relation to UE in the RRC_CONNECTED state.

Hereinafter, the UE implies a UE used by a user. However, when network equipment such as a base station transmits/receives a signal according to a communication scheme between UEs, the network equipment may also be considered as a type of the UE.

For convenience of explanation, acronyms used in the present specification are described.

A PSBCH (Physical Sidelink Broadcast CHannel) is a physical sidelink broadcast channel. A PSCCH (Physical Sidelink Control CHannel) is a physical sidelink control channel. A PSDCH (Physical Sidelink Discovery CHannel) is a physical sidelink discovery channel. A PSSCH (Physical Sidelink Shared CHannel) is a physical sidelink shared channel. An SLSS (SideLink Synchronization Signal) is a sidelink synchronization signal. The SLSS may include a PSSS (Primary Sidelink Synchronization Signal) and an SSSS (Secondary Sidelink Synchronization Signal). The SLSS and the PSBCH may be transmitted together.

Herein, a sidelink may imply a UE-to UE interface. The sidelink may correspond to a PC5 interface. D2D communication may be referred to as sidelink communication or, simply, communication. D2D discovery may be referred to as sidelink discovery, or, simply, discovery. A D2D UE implies a UE for performing a D2D operation. The D2D operation may include at least one of the D2D communication and the D2D discovery.

Hereinafter, for convenience of explanation, the present invention is described on the basis of a 3GPP LTE/LTE-A system. However, a scope of systems to which the present invention is applied can also be extended to other systems in addition to the 3GPP LTE/LTE-A system.

Now, V2X will be described.

V2X implies communication between a vehicle (a UE installed in the vehicle) and another UE. In 3GPP, four types of communication modes are supported in a sidelink. A mode 1 is a mode in which scheduling is performed by a BS in D2D, and a mode 2 is a mode in which scheduling is performed by a UE in a resource pool allocated by the BS. The modes 1 and 2 have been described above. A mode 3 is a mode in which scheduling is performed by the BS in V2X, and a mode 4 is a mode in which scheduling is performed by the UE in V2X.

The present invention relates to determining of a subframe used in sidelink transmission in V2X. That is, the present invention relates to a method of determining a sidelink subframe used in V2X transmission.

A set of sidelink subframes used in V2X transmission may be referred to as a V2X resource pool. The V2X resource pool may be indicated by a bitmap.

A method/rule for effectively considering: (A) a subframe (e.g., a downlink/special subframe (on a TDD shared carrier)) inappropriate to perform (/configure) V2X communication; and/or (B) a V2X channel (/signal) related (transmission) resource/subframe (e.g., a subframe including a synchronization signal (SLSS) resource) having a relatively high priority and to be protected from another V2X channel (/signal) collision (/interference) having a relatively low priority is proposed in case V2X (PSCCH/PSSCH) resource pool bitmap mapping.

The present invention may allow not to map the V2X resource pool bitmap (and/or allocate a V2X communication related subframe index) for a subframe (/resource) corresponding to (A) and (B).

Hereinafter, for convenience of explanation, the subframe (/resource) corresponding to (A) and (B) is referred to as a "skipped resource(s)/subframe(s)".

When a V2X (PSCCH/PSSCH) resource pool bitmap with a length "L" is repeatedly mapped (/applied) in a DFN range, if the number of (total) subframes in the DFN range (and/or the number of the remaining (total) subframes in the DFN range other than the "skipped resource/subframe") (this is denoted by TSFNUM) is not a multiple of L, the number of generated subframes in which the V2X (PSCCH/PSSCH) resource pool bitmap (and/or the V2X communication related subframe index) is not mapped (/allocated) is "MOD (TSFNUM, L)". Herein, MOD (A, B) implies a function for deriving a remainder value obtained by dividing A by B. Hereinafter, for convenience of explanation, the "MOD (TSFNUM, L)" subframes are referred to as "reserved subframe(s)".

The reason of configuring the reserved subframes may be to allow total bitmaps to be repeated in integer numbers in the DFN range. A logical subframe index of a subframe used in V2X communication may not be allocated in a reserved subframe, and a position of the reserved subframe may be indicated in an implicit manner.

A parameter Pstep may be adjusted based on a UL-DL configuration, and may be determined by Pstep_shared TDD=Pstep*(UL/(UL+DL+S)).

If UL-DL configurations of Table 1 are respectively denoted by TDD#0, 1, 2, 3, 4, 5, and 6, a bitmap length 60 may be supported for the TDD#0, a bitmap length 40 may be supported for the TDD#1, a bitmap length 20 may be supported for the TDD#2, a bitmap length 30 may be supported for the TDD#3, a bitmap length 20 may be supported for the TDD#4, a bitmap length 10 may be supported for the TDD#5, and a bitmap length 50 may be supported for the TDD#6.

A method of effectively distributing the (aforementioned) "reserved subframe" (in total subframes in the DFN range) is proposed below.

When applying rules proposed below, the "reserved subframe" may be distributed as uniformly or evenly as possible in the DFN range. Therefore, additional latency occurrence may be decreased (to the maximum extent possible) in V2X message transmission performed (/configured) based on a V2X communication related subframe index (e.g., since V2X message transmission with a specific period is performed based on the V2X communication related subframe index, an interval between V2X message transmissions actually performed may be greater than a (corresponding) specific period).

Figure 6:
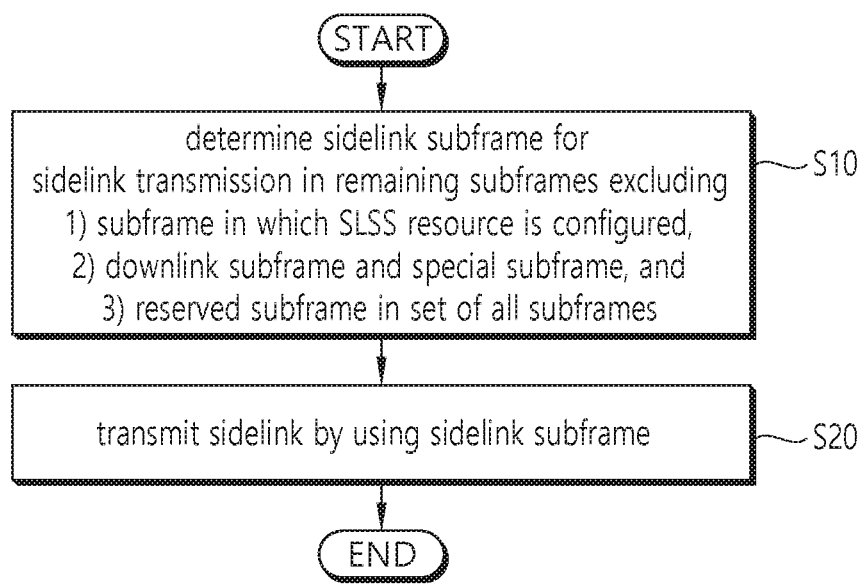
FIG. 6 shows a method of performing sidelink transmission of a UE according to an embodiment of the present invention.

FIG. 6 shows a method of performing sidelink transmission of a UE according to an embodiment of the present invention.

Referring to FIG. 6, at least one sidelink frame for sidelink transmission is determined in the remaining subframes excluding a subframe in which a sidelink synchronization signal (SLSS) resource is configured, a downlink subframe and a special subframe, and reserved subframes in a set of all subframes (S10). In addition, sidelink transmission is performed by using the at least one sidelink subframe (S20).

Herein, the set of all subframes may include 10240 subframes. That is, the 10240 subframes included in frames in a direct frame number (DFN) range of 0 to 1023 are referred to as a set of all subframes or a set of total subframes. One subframe may be 1 millisecond (ms) temporally.

[Proposed method#1] According to the following rule (/procedure), a position of a "reserved subframe" (in the DFN range) may be determined.

(STEP#1) "Re-indexing" is performed by considering only the remaining subframe(s) excluding a "skipped (resource/) subframe" among (total) subframes (i.e., 10240 subframes) in the DFN range. As described above, the skipped subframe may be a subframe in which an SLSS resource is configured and a downlink subframe and special subframe in a TDD cell.

For example, when (one) synchronization signal (SLSS) resource is configured (/signaled) with a period of "160 ms", the number of "skipped resources/subframes" in the total subframes in the DFN range is "64 (=10240/160)" (in case of not TDD).

Figure 7:
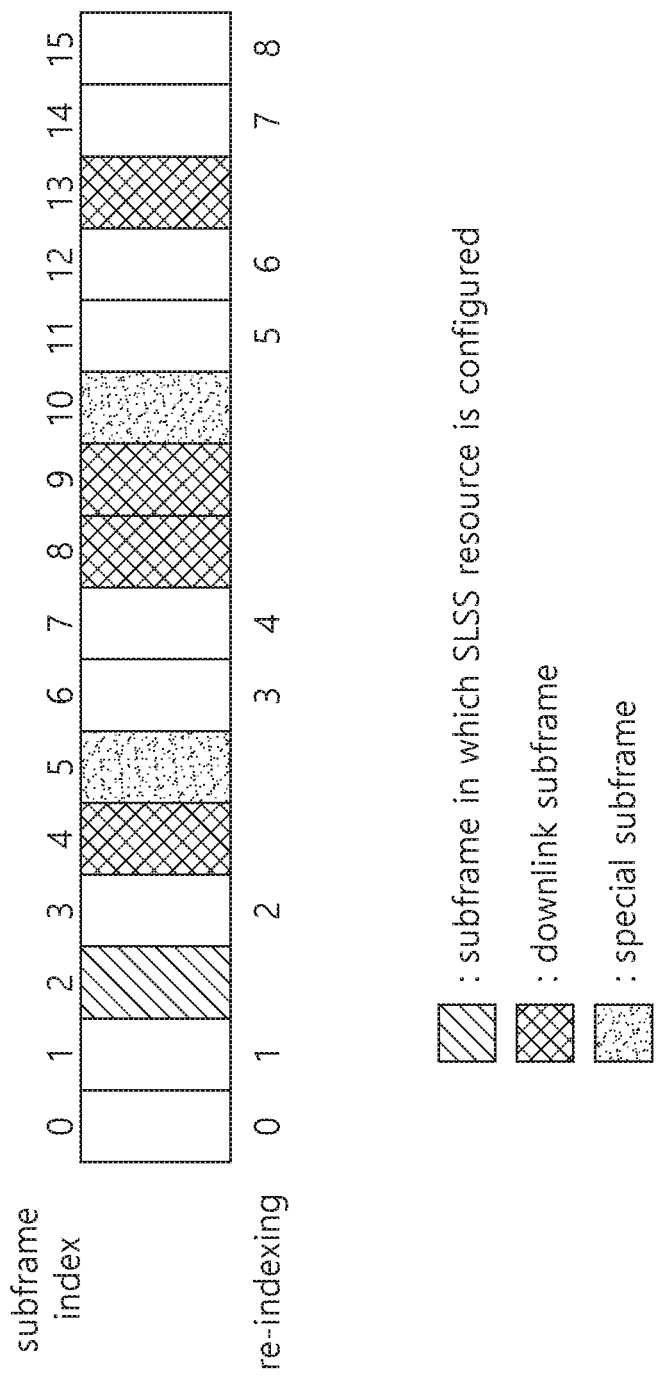
FIG. 7 shows an example in which "re-indexing" is performed by considering only the remaining subframes excluding a "skipped (resource/) subframe" among total subframe (i.e., 10240 subframes) in a DFN range.

FIG. 7 shows an example in which "re-indexing" is performed by considering only the remaining subframes excluding a "skipped (resource/) subframe" among total subframe (i.e., 10240 subframes) in a DFN range.

Referring to FIG. 7, total subframes have consecutive subframe indices (for convenience, only 0, 1, . . . , 15 are exemplified in FIG. 7). In this case, re-indexing may be performed in an increasing order up to 0, 1, . . . , 8 in regards to the remaining subframes excluding a subframe in which an SLSS resource is configured, a downlink subframe, and a specific subframe.

(STEP#2) (A) The number $N_{reserved}$ of "reserved subframes" and/or (B) a position of the "reserved subframe" on a "re-indexed subframe domain" after performing (/applying) STEP#1 may be derived by the following equation. Herein, FLOOR (Z) represents a function for deriving a maximum integer value less than or equal to Z.

(Example#2-1) The number $N_{reserved}$ of reserved subframes=MOD((the number of total subframes in a DFN range—the number of skipped resources/subframes), V2X resource pool bitmap length $L_{bitmap}$).

(Example#2-2) A position of a reserved subframe#M on a re-indexed subframe domain after performing(/applying) STEP#1=FLOOR(M·(the number of total subframes in a DFN range—the number of skipped resources/subframes)/the number $N_{reserved}$ of reserved subframes). Herein, "M=0, 1, . . . , (the number of reserved subframes-1).

Figure 8:
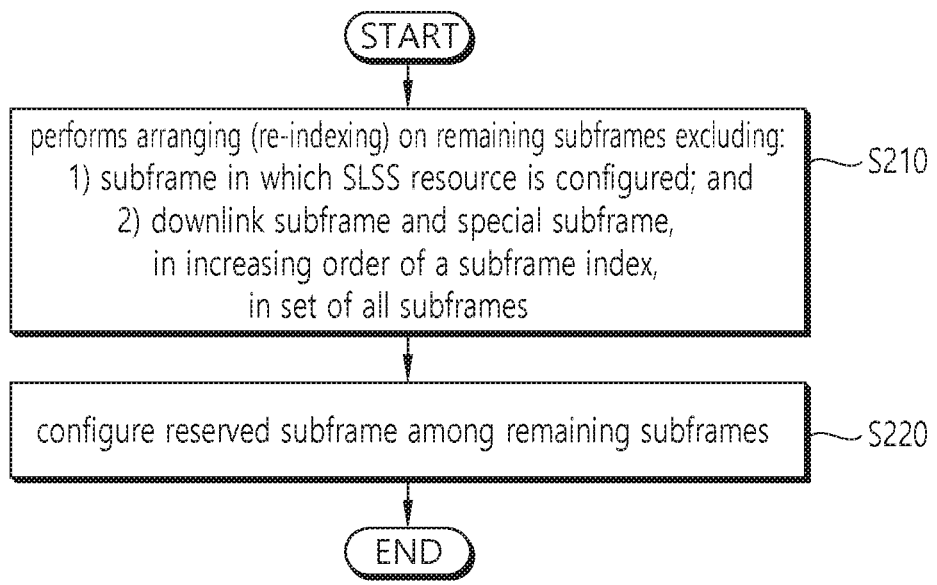
FIG. 8 exemplifies a method of performing the proposed method#1.

FIG. 8 exemplifies a method of performing the proposed method#1.

Referring to FIG. 8, a UE performs arranging (re-indexing) on the remaining subframes excluding: 1) a subframe in which an SLSS resource is configured; and 2) a downlink subframe and a special subframe, in an increasing order of a subframe index, in a set of all subframes (i.e., 10240 subframes) (S210). However, this is achieved only in case of time division duplex (TDD). For example, in case of frequency division duplex (FDD), the remaining subframes excluding a subframe in which an SLSS resource is configured in a set of all subframes (i.e., 10240 subframes) may be arranged (re-indexed) in an increasing order of a subframe index. The UE configures a reserved subframe among the remaining subframes (S220).

Figure 9:
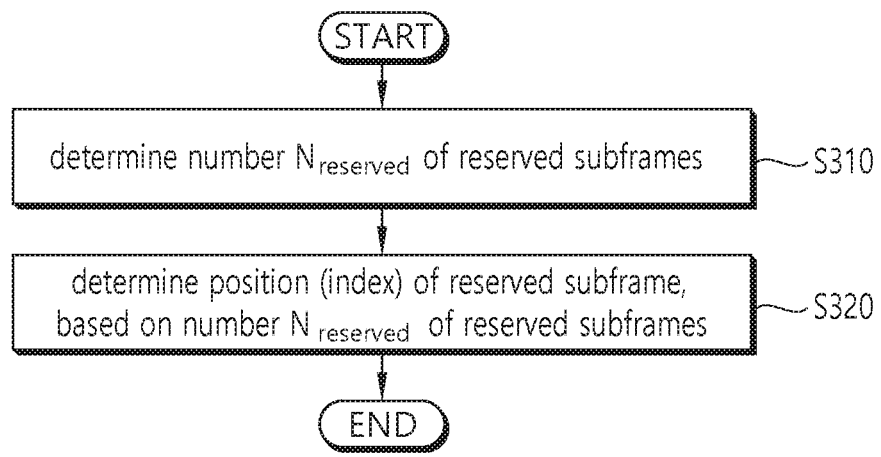
FIG. 9 shows a method of determining a position of a reserved subframe.

Herein, the reserved subframe may be determined by a method of FIG. 9.

FIG. 9 shows a method of determining a position of a reserved subframe.

Referring to FIG. 9, a UE determines the number $N_{reserved}$ of reserved subframes (S310), and determines a position (index) of the reserved subframe on the basis of the number $N_{reserved}$ of the reserved subframes (S320).

For example, according to the proposed method#1, a set of subframes belonging to a resource pool for sidelink transmission may be expressed by $(t_0^{SL}, t_1^{SL}, \ldots t_{Tmax}^{SL})$. Herein, it may be related as $0 \leq t_i^{SL} < 10240$.

A subframe index of the subframes may be given relatively for a subframe#0 of a radio frame corresponding to a system frame number (SFN) 0 or direct frame number or D2D frame number (DFN) of a serving cell. The subframe set may include the remaining subframes excluding subframes corresponding to 1), 2), and 3) described below.

1) A subframe in which an SLSS resource is configured, 2) a downlink subframe and a special subframe when sidelink transmission occurs in a TDD cell, 3) a reserved subframe.

That is, the remaining subframes excluding the subframes 1), 2), and 3) may be included in the subframe set. More specifically, in a TDD system, the remaining subframes excluding the subframes 1), 2), and 3) may be included in the subframe set. In an FDD system, the remaining subframes excluding the subframes 1) and 3) may be included in the subframe set.

In a set of all subframes (i.e., 10240 subframes), it is assumed that $l_0, l_1, \ldots, l_{(10240-N_{slss}-N_{dssf}-1)}$ denote subframes, excluding $N_{slss}$ and $N_{dssf}$, arranged in an increasing order of a subframe index. Herein, $N_{slss}$ denotes the number of subframes in which an SLSS resource is configured in 10240 subframes, and $N_{dssf}$ denotes the number of downlink subframes and special subframes in the 10240 subframes when sidelink transmission occurs in a TDD cell. When sidelink transmission occurs in an FDD cell, $N_{dssf}$ may be 0.

In this case, a subframe $l_r$ ($0 \leq r < (10240-N_{slss}-N_{dssf})$) satisfying the following equation may be a reserved subframe. That is, the reserved subframe lr may be determined by the Equation 1 below on the basis of the number $N_{reserved}$ of reserved subframes.

$$r = \left\lfloor \frac{m \cdot (10240 - N_{slss} - N_{dssf})}{N_{reserved}} \right\rfloor \quad \text{[Equation 1]}$$

Herein, $m=0, \ldots N_{reserved}-1$, $N_{reserved}=(10240-N_{slss}-N_{dssf}) \mod L_{bitmap}$.

Herein, $L_{bitmap}$ denotes a length of a bitmap configured by an upper layer. The Equation 1 above is the same as described in the example#2-1 and the example#2-2.

The UE may determine a set of subframes allocated to a resource pool (for V2X communication) as follows. The resource pool may be indicated through a bitmap ($b_0, b_1, \ldots, b_{Lbitmap}$). In this case, if $b_{k'}=1$ ($k'=k \mod L_{bitmap}$), a subframe $t_k^{SL}$ ($0 \leq k < (10240-N_{slss}-N_{dssf}-N_{reserved})$) may be used for V2X communication. The UE may determine a subchannel to be used in V2X transmission at the subframe $t_k^{SL}$. The subchannel may be a basic unit for resource allocation in V2X transmission.

Hereinafter, an example of determining a position of a "reserved subframe" in a DFN range is described in detail according to the proposed method#1. For convenience of explanation, a situation of being configured (/signaled) with "the number of total subframes in a DFN range=800", "the number of skipped resources/subframes in the DFN range=5 (=800/160) (e.g., when (one) synchronization signal resource is configured (/signaled) with a period of "160 ms")", "a V2X resource pool bitmap length=40" is assumed.

In the aforementioned situation, (according to the proposed method#1), it may be determined that "the number of reserved subframes=MOD ((800 -5), 40)=35" and "the position of the reserved subframe#M on the re-indexed subframe domain after performing (/applying) STEP#1=FLOOR (M.(800 -5)/35)". Herein, for example, it is determined that "M=0, 1, ... , 34".

In the aforementioned situation, the following table shows a subframe index on a re-indexed subframe domain to which 35 reserved subframes are mapped, on the re-indexed subframe domain after performing (/applying) STEP#1.

TABLE 2

| M | SUBFRAME INDEX MAPPED (OR LOCATED) WITH RESERVED SUBFRAME IN "RE-INDEXED SUBFRAME DOMAIN" |
|---|---|
| 0 | 0 |
| 1 | 22 |
| 2 | 45 |
| 3 | 68 |
| 4 | 90 |
| 5 | 113 |
| 6 | 136 |
| 7 | 159 |
| 8 | 181 |
| 9 | 204 |
| 10 | 227 |
| 11 | 249 |
| 12 | 272 |
| 13 | 295 |
| 14 | 318 |
| 15 | 340 |
| 16 | 363 |
| 17 | 386 |
| 18 | 408 |
| 19 | 431 |
| 20 | 454 |
| 21 | 477 |
| 22 | 499 |
| 23 | 522 |
| 24 | 545 |
| 25 | 567 |
| 26 | 590 |
| 27 | 613 |
| 28 | 636 |
| 29 | 658 |
| 30 | 681 |
| 31 | 704 |
| 32 | 726 |
| 33 | 749 |
| 34 | 772 |

Table 3 below exemplifies a process of deriving the subframe index of Table 2 above in greater detail.

TABLE 3

| SUBFRAME INDEX | SUBFRAME RE-INDEXING WITH EXCLUDING "SKIPPED RESOURCE(S) (/SUBFRAME(S))" | MAPPING RESERVED SUBFRAME(S) IN "RE-INDEXED SUBFRAME DOMAIN" | FINAL (TOTAL) EXCLUDED SUBFRAME(S) WEHN "V2X RESOURCE POOL BITMAP" IS APPLIED |
|---|---|---|---|
| 0 | (SYNCH. RESOURCE) | | EXCLUDED SUBFRAME |
| 1 | 0 | RESERVED SUBFRAME | EXCLUDED SUBFRAME |
| 2 | 1 | | |
| 3 | 2 | | |
| ... | ... | | |
| 23 | 22 | RESERVED SUBFRAME | EXCLUDED SUBFRAME |
| 24 | 23 | | |
| ... | ... | | |
| 45 | 44 | | |
| 46 | 45 | RESERVED SUBFRAME | EXCLUDED SUBFRAME |
| 47 | 46 | | |
| ... | ... | | |
| 68 | 67 | | |
| 69 | 68 | RESERVED SUBFRAME | EXCLUDED SUBFRAME |
| 70 | 69 | | |
| ... | ... | | |
| 90 | 89 | | |

TABLE 3-continued

| SUBFRAME INDEX | SUBFRAME RE-INDEXING WITH EXCLUDING "SKIPPED RESOURCE(S) (/SUBFRAME(S))" | MAPPING RESERVED SUBFRAME(S) IN "RE-INDEXED SUBFRAME DOMAIN" | FINAL (TOTAL) EXCLUDED SUBFRAME(S) WEHN "V2X RESOURCE POOL BITMAP" IS APPLIED |
|---|---|---|---|
| 91 | 90 | RESERVED SUBFRAME | EXCLUDED SUBFRAME |
| 92 | 91 | | |
| ... | ... | | |
| 113 | 112 | | |
| 114 | 113 | RESERVED SUBFRAME | EXCLUDED SUBFRAME |
| 115 | 114 | | |
| ... | ... | | |
| 136 | 135 | | |
| 137 | 136 | RESERVED SUBFRAME | EXCLUDED SUBFRAME |
| 138 | 137 | | |
| ... | ... | | |
| 158 | 157 | | |
| 159 | 158 | | |
| 160 | SYNCH. RESOURCE | | EXCLUDED SUBFRAME |
| 161 | 159 | RESERVED SUBFRAME | EXCLUDED SUBFRAME |
| 162 | 160 | | |
| 163 | 161 | | |
| ... | ... | | |
| 182 | 180 | | |
| 183 | 181 | RESERVED SUBFRAME | EXCLUDED SUBFRAME |
| 184 | 182 | | |
| ... | ... | | |
| 204 | 202 | | |
| 205 | 203 | | |
| 206 | 204 | RESERVED SUBFRAME | EXCLUDED SUBFRAME |
| 207 | 205 | | |
| ... | ... | | |
| 228 | 226 | | |
| 229 | 227 | RESERVED SUBFRAME | EXCLUDED SUBFRAME |
| 230 | 228 | | |
| ... | ... | | |
| 250 | 248 | | |
| 251 | 249 | RESERVED SUBFRAME | EXCLUDED SUBFRAME |
| 252 | 250 | | |
| ... | ... | | |
| 273 | 271 | | |
| 274 | 272 | RESERVED SUBFRAME | EXCLUDED SUBFRAME |
| 275 | 273 | | |
| ... | ... | | |
| 295 | 293 | | |
| 296 | 294 | | |
| 297 | 295 | RESERVED SUBFRAME | EXCLUDED SUBFRAME |
| 298 | 296 | | |
| ... | ... | | |
| 319 | 317 | | |
| 320 | SYNCH. RESOURCE | | EXCLUDED SUBFRAME |
| 321 | 318 | RESERVED SUBFRAME | EXCLUDED SUBFRAME |
| 322 | 319 | | |
| ... | ... | | |
| 342 | 339 | | |
| 343 | 340 | RESERVED SUBFRAME | EXCLUDED SUBFRAME |
| 344 | 341 | | |
| ... | ... | | |
| 365 | 362 | | |
| 366 | 363 | RESERVED SUBFRAME | EXCLUDED SUBFRAME |
| 367 | 364 | | |
| ... | ... | | |
| 388 | 385 | | |
| 389 | 386 | RESERVED SUBFRAME | EXCLUDED SUBFRAME |
| 390 | 387 | | |
| ... | ... | | |
| 410 | 407 | | |
| 411 | 408 | RESERVED SUBFRAME | EXCLUDED SUBFRAME |
| 412 | 409 | | |
| ... | ... | | |
| 433 | 430 | | |
| 434 | 431 | RESERVED SUBFRAME | EXCLUDED SUBFRAME |
| 435 | 432 | | |
| ... | ... | | |
| 456 | 453 | | |
| 457 | 454 | RESERVED SUBFRAME | EXCLUDED SUBFRAME |
| 458 | 455 | | |
| ... | ... | | |
| 477 | 474 | | |
| 478 | 475 | | |
| 479 | 476 | | |
| 480 | SYNCH. RESOURCE | | EXCLUDED SUBFRAME |
| 481 | 477 | RESERVED SUBFRAME | EXCLUDED SUBFRAME |
| 482 | 478 | | |
| ... | ... | | |
| 502 | 498 | | |
| 503 | 499 | RESERVED SUBFRAME | EXCLUDED SUBFRAME |
| 504 | 500 | | |
| ... | ... | | |
| 525 | 521 | | |
| 526 | 522 | RESERVED SUBFRAME | EXCLUDED SUBFRAME |
| 527 | 523 | | |
| ... | ... | | |
| 548 | 544 | | |
| 549 | 545 | RESERVED SUBFRAME | EXCLUDED SUBFRAME |
| 550 | 546 | | |
| ... | ... | | |
| 570 | 566 | | |
| 571 | 567 | RESERVED SUBFRAME | EXCLUDED SUBFRAME |
| 572 | 568 | | |
| ... | ... | | |
| 593 | 589 | | |
| 594 | 590 | RESERVED SUBFRAME | EXCLUDED SUBFRAME |
| 595 | 591 | | |
| ... | ... | | |
| 616 | 612 | | |
| 617 | 613 | RESERVED SUBFRAME | EXCLUDED SUBFRAME |
| 618 | 614 | | |
| ... | ... | | |
| 639 | 635 | | |
| 640 | SYNCH. RESOURCE | | EXCLUDED SUBFRAME |
| 641 | 636 | RESERVED SUBFRAME | EXCLUDED SUBFRAME |
| 642 | 637 | | |
| ... | ... | | |
| 662 | 657 | | |

TABLE 3-continued

| SUBFRAME INDEX | SUBFRAME RE-INDEXING WITH EXCLUDING "SKIPPED RESOURCE(S) (/SUBFRAME(S))" | MAPPING RESERVED SUBFRAME(S) IN "RE-INDEXED SUBFRAME DOMAIN" | FINAL (TOTAL) EXCLUDED SUBFRAME(S) WEHN "V2X RESOURCE POOL BITMAP" IS APPLIED |
|---|---|---|---|
| 663 | 658 | RESERVED SUBFRAME | EXCLUDED SUBFRAME |
| 664 | 659 | | |
| ... | ... | | |
| 685 | 680 | | |
| 686 | 681 | RESERVED SUBFRAME | EXCLUDED SUBFRAME |
| 687 | 682 | | |
| ... | ... | | |
| 708 | 703 | | |
| 709 | 704 | RESERVED SUBFRAME | EXCLUDED SUBFRAME |
| 710 | 705 | | |
| ... | ... | | |
| 730 | 725 | | |
| 731 | 726 | RESERVED SUBFRAME | EXCLUDED SUBFRAME |
| 732 | 727 | | |
| ... | ... | | |
| 753 | 748 | | |
| 754 | 749 | RESERVED SUBFRAME | EXCLUDED SUBFRAME |
| 755 | 750 | | |
| ... | ... | | |
| 776 | 771 | | |
| 777 | 772 | RESERVED SUBFRAME | EXCLUDED SUBFRAME |
| 778 | 773 | | |
| ... | ... | | |
| 799 | 794 | | |

As shown in Table 3, in a set of all subframes (subframe indices 0 to 799), the remaining subframes excluding subframes in which an SLSS resource is configured are arranged (re-indexed) in an increasing order of a subframe index, and a reserved subframe is determined in the re-indexed subframes. In addition, in the set of all subframes (subframe indices 0 to 799), a bitmap is applied to the remaining subframes excluding the reserved subframe and all subframes in which the SLSS resource is configured.

Meanwhile, in order to correctly perform V2X communication between an in-coverage UE and an out-coverage UE, a DFN index in a V2X resource pool assumed (/understood) by a corresponding UE must be identical. Otherwise, since different UEs may differently interpret operations managed (/counted) based on a FDN index in a V2X resource pool (e.g., a "virtual subframe index" (re-)counted (/indexed) in the V2X resource pool instead of a "physical subframe index") (e.g., counting at a time when a reserved resource of a specific period appears), it may be difficult to normally perform V2X communication.

The rule proposed below provides a method in which an in/out-coverage UE equally interprets a DFN index (in a V2X resource pool) when "the number of synchronization signal (transmission (/reception)) resources (SLSS resources)" configured (/signaled) is different between the in-coverage UE and the out-coverage UE, for example, when the number (e.g., 1) of SLSS resources configured (/signaled) to the in-coverage UE is less than that (e.g., 2 or 3) of the out-coverage UE or when the (maximum) number (e.g., 1) of SLSS resources that can be configured (/signaled) to the in-coverage UE is less than that (e.g., 3) of the out-coverage UE.

As described above, it is assumed that the SLSS resource is a subframe (/resource) (e.g., a "skipped resource/subframe") to which a V2X resource pool related bitmap is not mapped (and/or a V2X communication related DFN index is not allocated).

In the present proposed rule, the term "SLSS resource" may be extendedly interpreted as a "reserved subframe" (or a "skipped resource/subframe" or a "subframe (/resource)") (to which a V2X resource pool related bitmap is not mapped (and/or a V2X communication related DFN index is not allocated)).

[Proposed method#2] An in-coverage UE may be allowed to additionally exclude an SLSS resource on a pre-configuration (applied in an out-coverage case) in V2X resource pool related bitmap mapping (and/or V2X communication related DFN index allocation).

Among out-coverage SLSS resources on the pre-configuration, since overlapping with an in-coverage SLSS resource position has already been excluded once in a form of an in-coverage SLSS resource, duplicated exclusion can be avoided.

When a corresponding rule is applied, if a "(pre-configured (/signaled)) X-th (e.g., 'X=1') out-coverage SLSS resource" position configuration (/signaling) related subframe offset value (referred to as OUT_FST_OFFVAL) and an "in-coverage SLSS resource" position configuration (/signaling) related subframe offset value (referred to as IN_OFFVAL) are (always) identical, the in-coverage UE may be allowed to exclude a (remaining) out-coverage SLSS resource directly at a (subframe) position indicated by an (associated) subframe offset on a pre-configuration.

For another example, the in-coverage UE may be allowed to exclude a (subframe) position related to an out-coverage SLSS resource with a difference of a relative distance to the remaining out-coverage SLSS resource related subframe offset by assuming an X-th (e.g., 'X=1') subframe offset configured (/signaled) previously among out-coverage SLSS resource position configuration (/signaling) related subframe offsets on a pre-configuration.

For example, when it is configured (/signaled) that "IN_OFFVAL=10" and "first/second/third out-coverage SLSS resource related subframe offset=15/20/50", the in-coverage UE additionally excludes a "subframe #15" and a "subframe #45" (to the out-coverage SLSS resource) (in addition to an in-coverage SLSS resource (subframe #10)).

When the aforementioned rule is applied, an out-coverage SLSS resource (additionally) excluded may be interpreted as a type of (virtual) "skipped resource/subframe" (or "reserved subframe").

In addition, for example, the applying of the rule may be interpreted that a UE which has entered (/changed) to an in-coverage state (from an out-coverage state) does not override or reset some parameters (e.g., an out-coverage SLSS resource subframe offset) on a pre-configuration to a (in-coverage) parameter configured (/signaled) (e.g., RRC signaling) from a (serving) BS.

For another example, a "V2X resource pool configuration (/signaling) related bitmap size (/length)" may be (always) selected (/adjusted) equally for the in/out-coverage UE (by a network (/BS)). When a corresponding rule is applied, "the number of reserved subframes" may be (always) maintained equally in the in/out-coverage V2X resource pool.

Examples for the aforementioned proposed method can be included as one of implementation methods of the present invention, and thus can be apparently regarded as a sort of proposed methods. In addition, although the aforementioned proposed methods can be independently implemented, it is also possible to be implemented by combining (or merging) some proposed methods. Although the proposed method is described on the basis of a 3GPP LTE/LTE-A system for convenience of explanation, a system to which the proposed method is applied can also be extended to another system other than the 3GPP LTE system. For example, the proposed methods of the present invention can also be extendedly applied for D2D communication. Herein, for example, the D2D communication implies that a UE communicates with a different UE directly by using a radio channel. For example, although the UE implies a UE of a user, when a network device such as a BS transmits/receives a signal according to a communication scheme between UEs, it may also be regarded as a sort of the UE. In addition, the proposed methods of the present invention may be limitedly applied only to a mode-3 V2X operation (and/or a mode-4 V2X operation).

Figure 10:
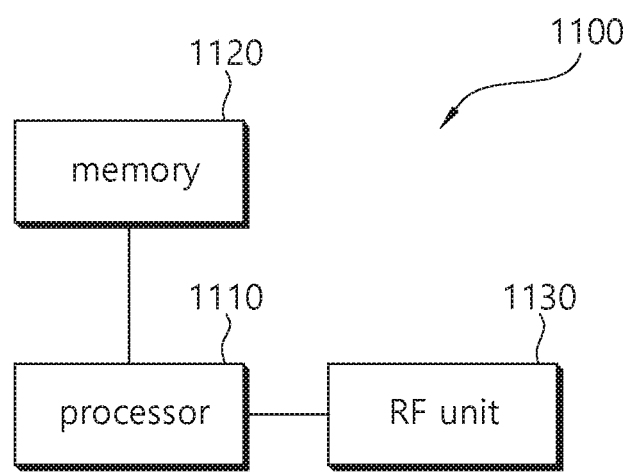
FIG. 10 is a block diagram showing a device according to an embodiment of the present invention.

FIG. 10 is a block diagram showing a device according to an embodiment of the present invention.

Referring to FIG. 10, a device 1100 includes a processor 1110, a memory 1120, and a radio frequency (RF) unit 1130. The processor 1110 implements proposed functions, procedures, and/or methods. The device 1100 may be a UE or a BS.

The RF unit 1130 is coupled to the processor 1110 to transmit and receive a radio signal. The RF unit 1130 may also be referred to as a transceiver.

The processor may comprise an application-specific integrated circuit (ASIC), other chipset, logic circuitry and/or data processing device. The memory may include read-only memory (ROM), random access memory (RAM), flash memory, memory cards, storage media, and/or other storage devices. The RF unit may include a baseband circuit for processing the radio signal. When the embodiment is implemented in software, the above-described techniques may be implemented with modules (processes, functions, and so on) that perform the functions described above. The module may be stored in the memory and may be executed by the processor. The memory may be internal or external to the processor, and may be coupled to the processor by various well known means.

What is claimed is:

1. A method for performing sidelink transmission of a user equipment (UE) in a wireless communication system, the method comprising:

determining at least one subframe for sidelink transmission in remaining subframes excluding a subframe in which a sidelink synchronization signal (SLSS) resource is configured and a reserved subframe in a set of all subframes; and performing sidelink transmission by using the at least one sidelink subframe, wherein if the wireless communication system is a time division duplex (TDD) system, the reserved subframe is determined by arranging the remaining subframes, excluding the subframe in which the SLSS resource is configured, a downlink subframe, and a special subframe, in an increasing order of a subframe index, in the set of all subframes, and on the basis of a number $N_{reserved}$ of reserved subframes among the remaining subframes, wherein the number $N_{reserved}$ of the reserved subframes is determined based on a length $L_{bitmap}$ of a bitmap indicating the at least one sidelink subframe and the number of the remaining subframes, and wherein, when $l_0, l_1, \ldots, l_{(10240-N_{slss}-N_{dssf}-1)}$ denote subframes, excluding a number $N_{slss}$ of subframes in which the SLSS resource is configured and a number $N_{dssf}$ of downlink subframes and special subframes, arranged in an increasing order of a subframe index in the set of all subframes, the reserved subframe $l_r$ ($0 \leq r < (10240-N_{slss}-N_{dssf})$) is determined by the following equation:

$$r = \left\lfloor \frac{m \cdot (10240 - N_{slss} - N_{dssf})}{N_{reserved}} \right\rfloor,$$

where $m=0, \ldots, N_{reserved}-1$, $N_{reserved}=(10240-N_{slss}-N_{dssf})$ mod $L_{bitmap}$.

2. The method of claim 1, wherein the set of all subframes includes 10240 subframes.

3. The method of claim 1, wherein the length $L_{bitmap}$ of the bitmap is configured by a higher layer.

4. The method of claim 1, wherein the wireless communication system is a frequency division duplex (FDD) system.

5. The method of claim 1, wherein if the wireless communication system is a time division duplex (TDD) system, at least one sidelink subframe for sidelink transmission is determined in remaining subframes excluding a subframe in which a sidelink synchronization signal (SLSS) resource is configured, a downlink subframe and a special subframe, and a reserved subframe in the set of all subframes.

6. A user equipment (UE) comprising:

a transceiver for transmitting and receiving a radio signal; and a processor operatively coupled to the transceiver, wherein the processor is configured to:

determine at least one subframe for sidelink transmission in remaining subframes excluding a subframe in which a sidelink synchronization signal (SLSS) resource is configured and a reserved subframe in a set of all subframes; and perform sidelink transmission by using the at least one sidelink subframe, wherein if the wireless communication system is a time division duplex (TDD) system, the reserved subframe is determined by arranging the remaining subframes, excluding the subframe in which the SLSS resource is configured, a downlink subframe, and a special subframe, in an increasing order of a subframe index, in the set of all subframes, and on the basis of a number $N_{reserved}$ of reserved subframes among the remaining subframes, wherein the number $N_{reserved}$ of the reserved subframes is determined based on a length $L_{bitmaap}$ of a bitmap indicating the at least one sidelink subframe and the number of the remaining subframes, and wherein, when $l_0, l_1, \ldots, l_{(10240-N_{slss}-N_{dssf}-1)}$ denote subframes, excluding a number $N_{slss}$ of subframes in which the SLSS resource is configured and a number $N_{dssf}$ of downlink subframes and special subframes, arranged in an increasing order of a subframe index in the set of all subframes, the reserved subframe $l_r$ ($0 \leq r < (10240-N_{slss}-N_{dssf})$) is determined by the following equation:

$$r = \left\lfloor \frac{m \cdot (10240 - N_{slss} - N_{dssf})}{N_{reserved}} \right\rfloor,$$

where $m=0, \ldots, N_{reserved}-1$, $N_{reserved}=(10240-N_{slss}-N_{dssf}) \bmod L_{bitmap}$.

7. The UE of claim 6, wherein the set of all subframes includes 10240 subframes.

8. The UE of claim 6, wherein the length $L_{bitmap}$ of the bitmap is configured by a higher layer.

9. The UE of claim 6, wherein the wireless communication system is a frequency division duplex (FDD) system.

10. The UE of claim 6, wherein if the wireless communication system is a time division duplex (TDD) system, at least one sidelink subframe for sidelink transmission is determined in remaining subframes excluding a subframe in which a sidelink synchronization signal (SLSS) resource is configured, a downlink subframe and a special subframe, and a reserved subframe in the set of all subframes.

* * * * *